United States Patent
Klein

(10) Patent No.: US 6,219,795 B1
(45) Date of Patent: Apr. 17, 2001

(54) THERMAL MANAGEMENT APPARATUS BASED ON A POWER SUPPLY OUTPUT

(75) Inventor: Dean A. Klein, Eagle, ID (US)

(73) Assignee: Micron Electronics, Inc., Nampa, ID (US)

(*) Notice: Subject to any disclaimer, the term of this patent is extended or adjusted under 35 U.S.C. 154(b) by 0 days.

(21) Appl. No.: 09/240,548

(22) Filed: Jan. 29, 1999

(51) Int. Cl.[7] .................... G06F 1/26; G06F 1/20
(52) U.S. Cl. ............................. 713/300; 713/322
(58) Field of Search .................... 713/320, 323, 713/324, 321, 310, 322, 340, 300; 714/14; 361/695; 379/323, 413; 307/31, 66; 340/636, 660; 710/260

(56) References Cited

U.S. PATENT DOCUMENTS

| | | |
|---|---|---|
| 5,532,935 | 7/1996 | Ninomiya et al. . |
| 5,570,286 | 10/1996 | Margolis et al. . |
| 5,606,704 * | 2/1997 | Pierce et al. . |
| 5,664,202 * | 9/1997 | Chen et al. . |
| 5,754,870 * | 5/1998 | Pollard et al. . |
| 5,832,286 * | 11/1998 | Yoshida . |
| 5,848,282 * | 12/1998 | Kang . |
| 5,883,523 | 3/1999 | Ferland et al. . |
| 5,954,820 * | 9/1999 | Hetzler . |
| 5,955,945 | 9/1999 | Fuhrer . |
| 5,996,084 | 11/1999 | Watts . |

* cited by examiner

Primary Examiner—Gopal C. Ray
(74) Attorney, Agent, or Firm—Trop, Pruner & Hu, P.C.

(57) ABSTRACT

A power management apparatus includes a power source, a detection circuit to generate a first signal indicating the power transferred to a portion of a computer system from the power source, and a control circuit to generate at least one control signal to effect a power management action based on the first signal. A program storage device (readable by a programmable control device) includes instructions to manage power in a computer system. The program storage device includes instructions to receive a power signal from a power source (the power signal furnishing power to a portion of the computer system), generate a first signal indicating the power transferred from the power source to the portion of the computer system, and generate a second signal to effect a power management action based on the first signal.

24 Claims, 5 Drawing Sheets

THERMAL MANAGEMENT APPARATUS BASED ON A POWER SUPPLY OUTPUT

RELATED APPLICATIONS

This application is related to U.S. application Ser. No. 09/239,635, filed Jan. 29, 1999.

BACKGROUND

The invention relates generally to power management in electronic circuits and more particularly, to power management based on a direct measure of a circuit's power consumption.

Power management techniques in, for example, a computer system typically employ thermal sensors and/or inactivity timers. Thermal sensors provide an indirect mechanism to monitor and control a circuit's power consumption by measuring the heat generated by one or more components within the circuit. System response to an over temperature condition is generally to reduce the operating speed of the computer system's central processing unit (CPU). This may be accomplished by asserting a stop clock signal (an input signal to many modern CPU devices) for some period of time, typically in a pulse width modulation (PWM) fashion, or by actually reducing the system clock frequency.

Many modern computer systems use only a limited number of thermal sensors. Most personal computer systems use only a single thermal sensor located near the CPU. Since the CPU is a large heat source, and one whose power consumption is highly subject to the computational task involved, this approach has been prudent. Still, thermal sensors have a number of limitations which make their use sub-optimal. One limitation is that thermal sensors are generally physically separated from the circuits they monitor. (This is true even if the thermal sensor is part of the CPU die.) Thus, the temperature indicated by a thermal sensor is only a rough estimate of the temperature of a device. Another limitation is that thermal sensors rely on the transfer of thermal energy from the circuits generating heat. This takes time. Thus, the current temperature indicated by a thermal sensor most accurately reflects the temperature of a device at some prior time. Yet another limitation is that thermal sensors located near a CPU are dominated by CPU thermal events. Thus, even though other system components may generate a significant amount of heat (representing a significant amount of power consumption), this generally goes undetected.

Inactivity timers, on the other hand, are generally used to power down input-output (I/O) ports and peripheral devices when they have not been used for a specified amount of time. As such, inactivity timers generally do not protect devices from an over temperature condition when they are being used.

Thus, it would be beneficial to provide a mechanism to protect electronic circuits from an over temperature condition based on a direct measure of a circuit's power consumption.

SUMMARY

In one embodiment, the invention provides an apparatus to manage power consumption in a computer system. The apparatus may include a power source furnishing power to the computer system, a detection circuit, coupled to the power source, to generate a first signal indicating the power transferred to a portion of the computer system from the power source, and a control circuit, coupled to the detection circuit, to generate at least one control signal to effect a power management action based on the first signal. By way of example, the power source may be a switching or linear power supply, and the second signal may be a fan control signal, a processor halt signal, or a processor interrupt signal, or a stop-clock signal.

In another embodiment, the invention provides a program storage device readable by a programmable control device that includes instructions to manage power in a computer system. The program storage device includes instructions to receive a power signal from a power source (the power signal furnishing power to a portion of the computer system), generate a first signal indicating the power transferred from the power source to the portion of the computer system, and generate a second signal to effect a power management action based on the first signal.

DETAILED DESCRIPTION

Techniques (including methods and devices) to manage power consumption of a circuit based on a direct measure of the power consumed by the circuit are described. The following embodiments of this inventive concept, described in terms of a personal computer system, are illustrative only and are not to be considered limiting in any respect.

Figure 1:
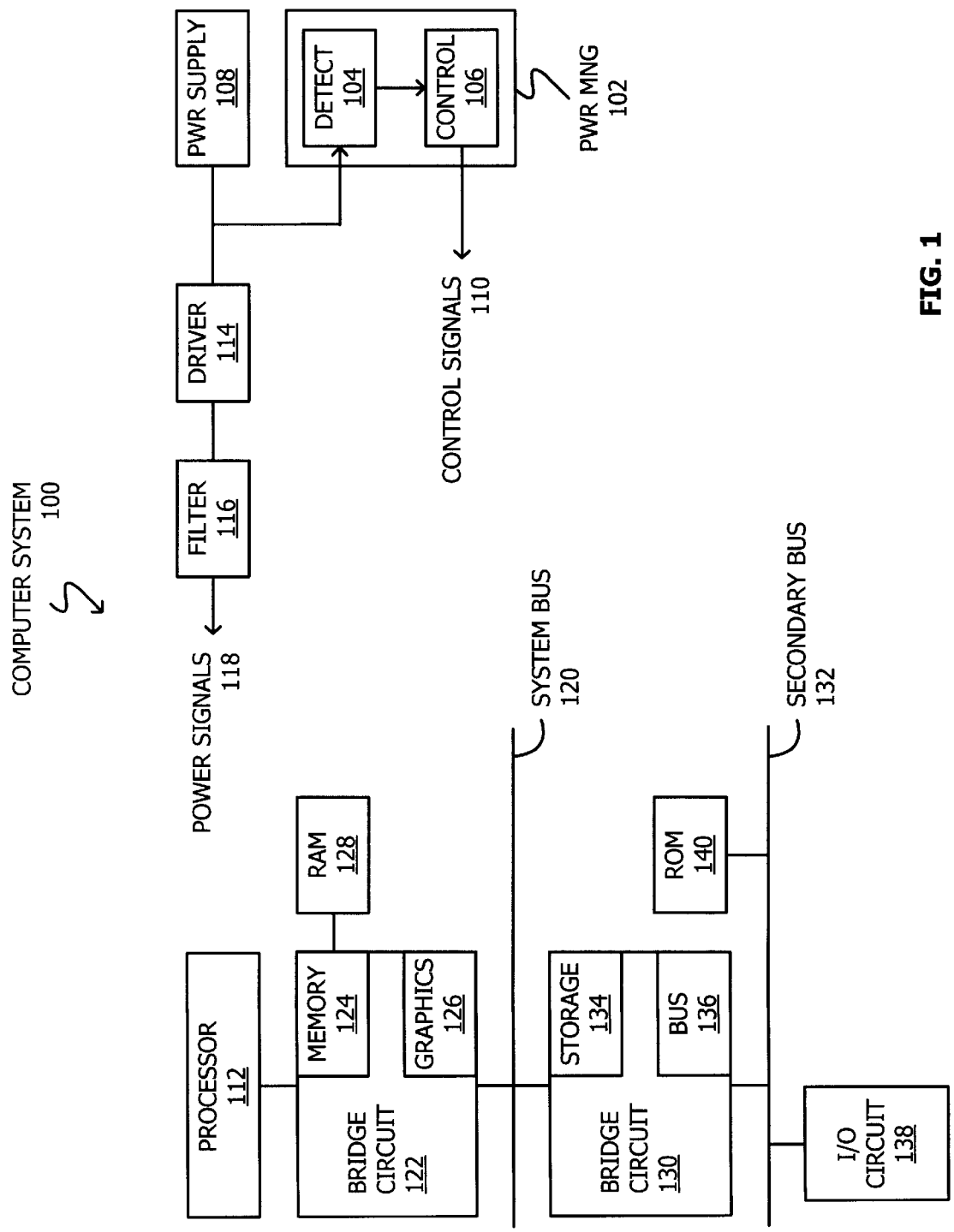
FIG. 1 shows a computer system in accordance with one embodiment of the invention.

Referring to FIG. 1, computer system 100 having power management circuit 102 in accordance with one embodiment of the invention is illustrated. As shown, power management circuit 102 may include detection circuit 104 and control circuit 106. Detection circuit 104 determines the actual power consumption of computer system 100 from power supply 108. Based on the detected power consumption, control circuit 106 may generate control signals 110 to modify the operation of computer system 100. For example, if power management circuit 102 determines that the measured power consumption warrants additional cooling, control signals 110 may selectively enable cooling fans (not shown), reduce the operating frequency of a system clock (not shown), temporarily halt processor 112, or power computer system 100 down. Conversely, if power management circuit 102 determines that the measured power consumption warrants less cooling, control signals 110 may selectively disable fans, increase the operating frequency of the system clock, or release processor 112 from a halted state.

In one embodiment, power supply 108 may be a linear power supply. In another embodiment, power supply 108 may be a switching power supply. In yet another embodiment, power supply 108 may include a primary power supply (linear or switching) and one or more slave regulators. Regardless of its configuration, power supply 108 generates one or more output signals generally indicating the power supplied to computer system 100 including, perhaps, peripherals. As indicated, output from power supply 108 is typically processed by driver circuit 114 (e.g., high-current field effect transistors) and low pass filter 116 before being supplied to components of computer system 100 in the form of one or more power signals 118. For example, power signals 118 may be voltage or current signals that directly supply power. Generally, power signals 118 may be one or more PWM signals.

In addition to power management circuit 102 and power supply 108, computer system 100 may include processor 112 coupled to system bus 120 through bridge circuit 122. Processor 112 may be one or more general or special purpose processors or a custom designed state machine. Bridge circuit 122 may also provide memory and graphics port interfaces 124 and 126 respectively. Random access memory (RAM) 128 may be coupled to computer system 100 via memory interface 124. An illustrative system bus 120 conforms to the Peripheral Component Interconnect (PCI) bus specification.

In addition, bridge circuit 130 may couple system bus 120 to secondary bus 132, while also providing storage and bus interfaces 134 and 136 respectively. Illustrative secondary buses include buses that conform to the PCI, Low Pin Count (LPC), Industry Standard Interface (ISA), and Extended Industry Standard Interface (EISA) specifications. Common storage devices include magnetic and optical disk drives. A common bus interface conforms with the Universal Serial Bus (USB) standard. Input-output (I/O) circuit 138 and system read only memory (ROM) 140 may also be coupled to secondary bus 132. Input-output circuit 138 may provide peripheral interfaces such as parallel and serial ports, floppy disk ports, and infrared ports.

Figure 2:
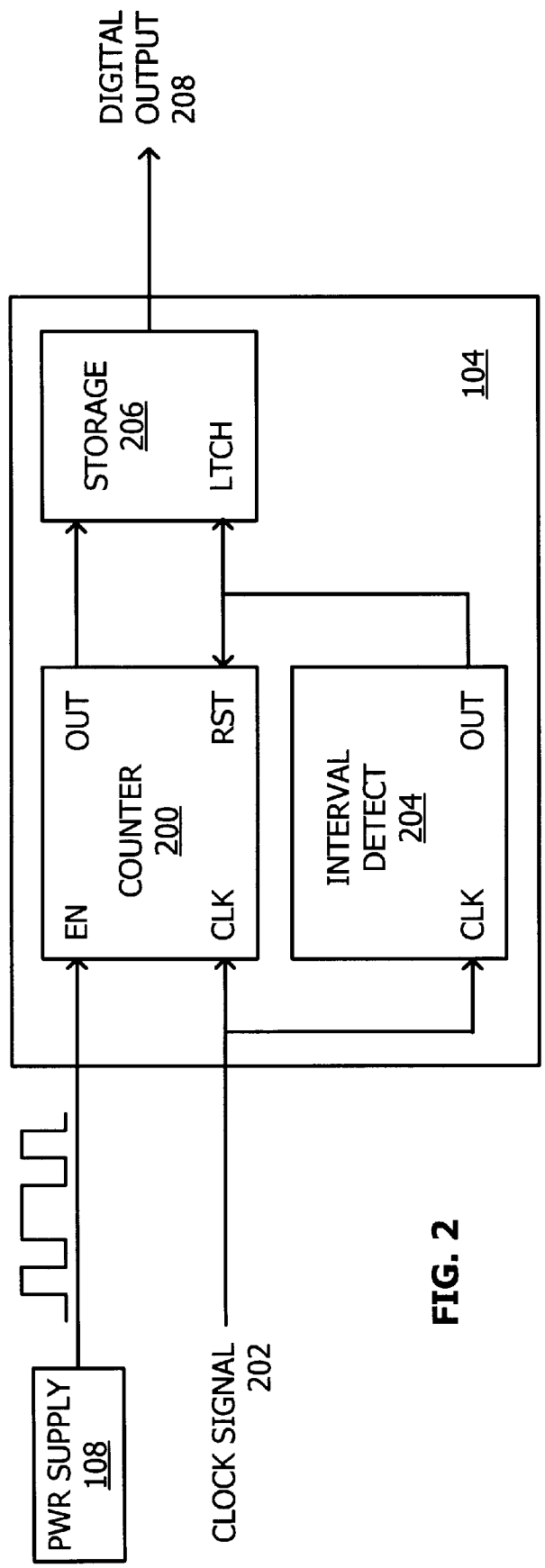
FIG. 2 shows a block diagram of a power detection circuit that generates a digital output signal in accordance with one embodiment of the invention.

In one embodiment, where power supply 108 is a switching power supply and thus power signal output is a pulse width modulated (PWM) signal, detection circuit 104 may generate a digital representation of the PWM signal's duty cycle to provide a direct indication of the power being consumed by computer system 100. Referring to FIG. 2, a PWM power signal drives the enable input (EN) of counter 200. Clock signal 202 drives the clock input (CLK) of both counter 200 and interval detection circuit 204. Interval detection circuit 204 may periodically (and temporarily) assert its output signal (OUT) to cause counter 200 output to be stored into storage device 206 (via the LTCH input) and to reset counter 200 (via the RST signal). For example, interval detection circuit 204 output may be a short duration pulse. Alternatively, interval detection circuit 204 output may be two pulses: the first pulse causing counter 200 output to be loaded into storage device 206; the second pulse (occurring substantially immediately following the first pulse) causing counter 200 to reset. In this configuration, digital output 208 provides an indication of the duty cycle of power supply 108's PWM output signal.

Figure 3:
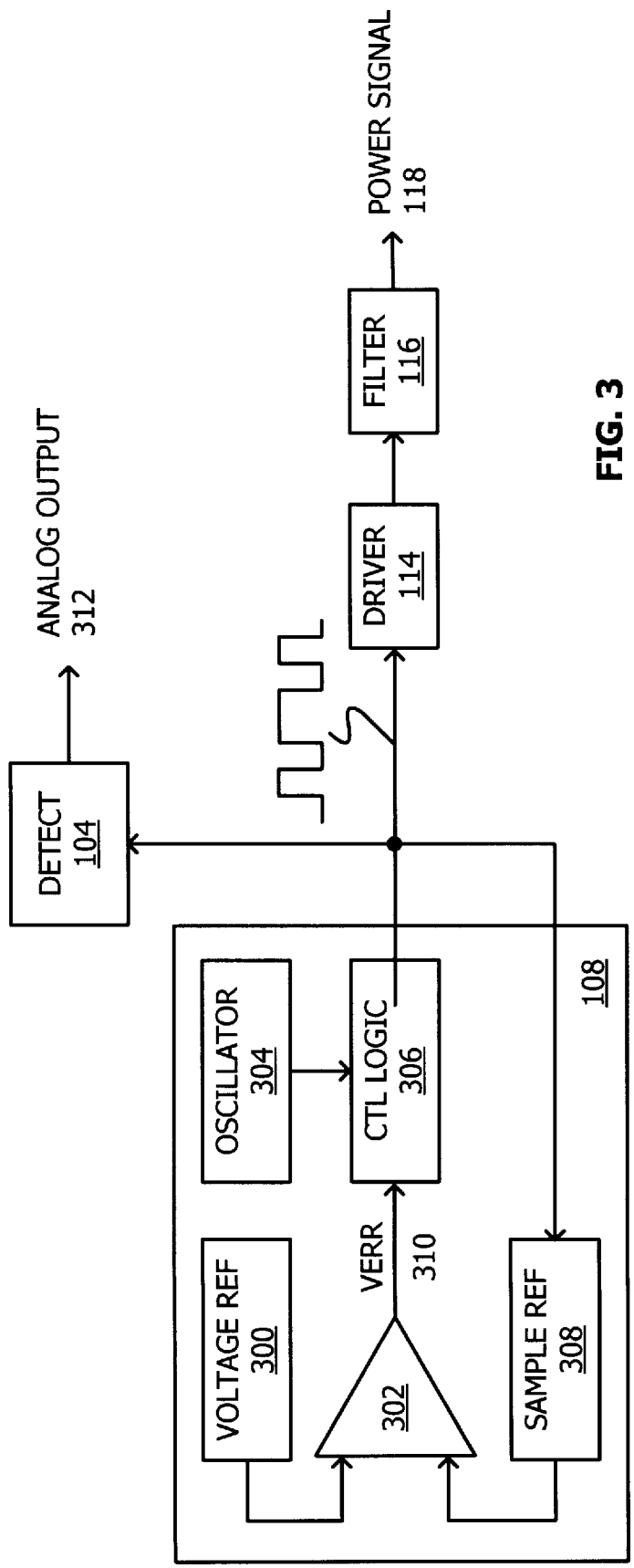
FIG. 3 shows a block diagram of a power detection circuit that generates an analog output signal in accordance with one embodiment of the invention.

In another embodiment, detection circuit 104 may generate an analog representation of the duty cycle of power supply 108's PWM output signal. As shown in FIG. 3, a typical switching power supply (e.g., power supply 108) includes voltage reference source 300, error signal amplifier 302, oscillator 304, control logic 306 (e.g., a transistor), and sampling network 308. In general, switching power supply 108 couples a sampled version (via sampling network 308) of its output to differential amplifier 302. Differential amplifier 302 compares a portion of this signal to a reference voltage (supplied by voltage reference source 300) to generate error signal ($V_{ERR}$) 310. Error signal 310 modulates control logic 306 to generate power supply output which, in one embodiment, is processed by driver and filter circuits 114 and 116 respectively. Power supply output may be used by detection circuit 104 to provide an analog indication 312 of the actual power being supplied by power supply 108. For example, in one embodiment detection circuit 104 may be a resistor-capacitor (RC) circuit. In another embodiment, detection circuit 104 may be an operational amplifier configured as an integrator.

Figure 4:
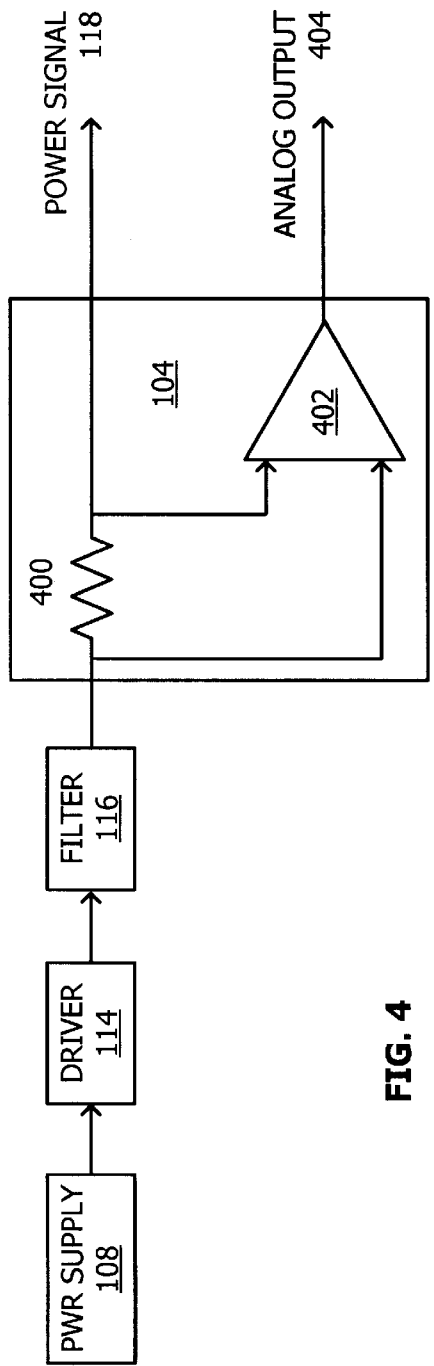
FIG. 4 shows a block diagram of a power detection circuit that generates an analog output signal in accordance with another embodiment of the invention.

In yet another embodiment, detection circuit 104 may generate an analog representation of the duty cycle of power supply 108's PWM output signal by generating a current signal proportional to the power being provided by power supply 108. Referring to FIG. 4, for example, resistor 400 may be coupled in series with output from filter 116 to generate a voltage drop. The voltage drop, in turn, may be detected and, possibly, amplified by amplifier 402 to generate detection circuit output (analog output signal 404.).

Figure 5:
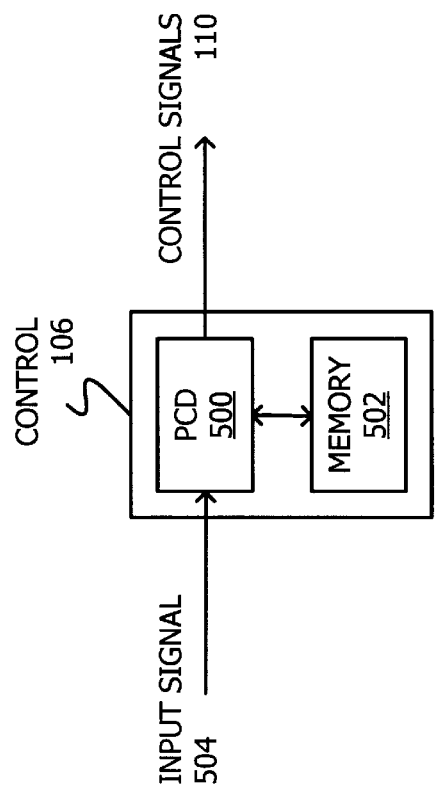
FIG. 5 shows a block diagram of a control circuit in accordance with one embodiment of the invention.

Referring to FIG. 5, control circuit 106 configured to accept a digital signal indicating a power signal's duty cycle may include programmable control device (PCD) 500 and memory 502. An illustrative programmable control device 500 may be a general purpose microprocessor, a microcontroller, or a custom designed state machine embodied in, for example, a printed circuit board comprising discrete logic, integrated circuits, specially designed application specific integrated circuits (ASICs), or programmable gate array devices.

In one embodiment, PCD 500 may be programmed to generate control signals 110 based on the amount of power being consumed as indicated by input signal 504. For example, if input signal 504 indicates X amount of power is being consumed, PCD 500 may selectively enable one or more cooling fans via control signals 110. If input signal 504 indicates X+Y amount of power is being consumed, PCD 500 may, in addition to or in lieu of enabling cooling fans, selectively reduce the clock frequency provided processor 112 by a specified amount (this amount may vary as the value of Y changes, for example). If input signal 504 indicates X+Y+Z amount of power is being consumed, PCD 500 may generate a stop clock signal to processor 112 or even initiate powering down of computer system 100. The number of levels (e.g., X, Y, and Z) and the precise value associated with each value is a matter of design choice and may vary from system to system.

In another embodiment, PCD 500 may determine the rate of change of power consumption (as indicated by power consumption signal 504). This determination may be used to select a power management option, e.g., enable or disable cooling fans, reduce or increase the clock frequency provided processor 112, or powering off peripheral devices.

In yet another embodiment, PCD 500 may be adapted to generate interrupt control signals to processor 112. For example, if the interface between the computer system's operating system, hardware and basic input-output system (BIOS) software is defined by the advanced configuration and power interface (ACPI) specification, the PCD may generate a system control interrupt (SCI) to notify the operating system of a power management event. If, on the other hand, the interface between the computer system's BIOS and hardware is defined by the advanced power management (APM) specification, the PCD may generate a system management interrupt (SMI) to notify the operating system of a power management event.

Memory 502 may be used to store instructions to implement the above described control options and may also include data which may determine values for, for example, X, Y, and Z. Memory 502 may include nonvolatile memory such as EPROM, EEPROM, and flash devices. Further, memory 502 may be incorporated within PCD 500.

Figure 6:
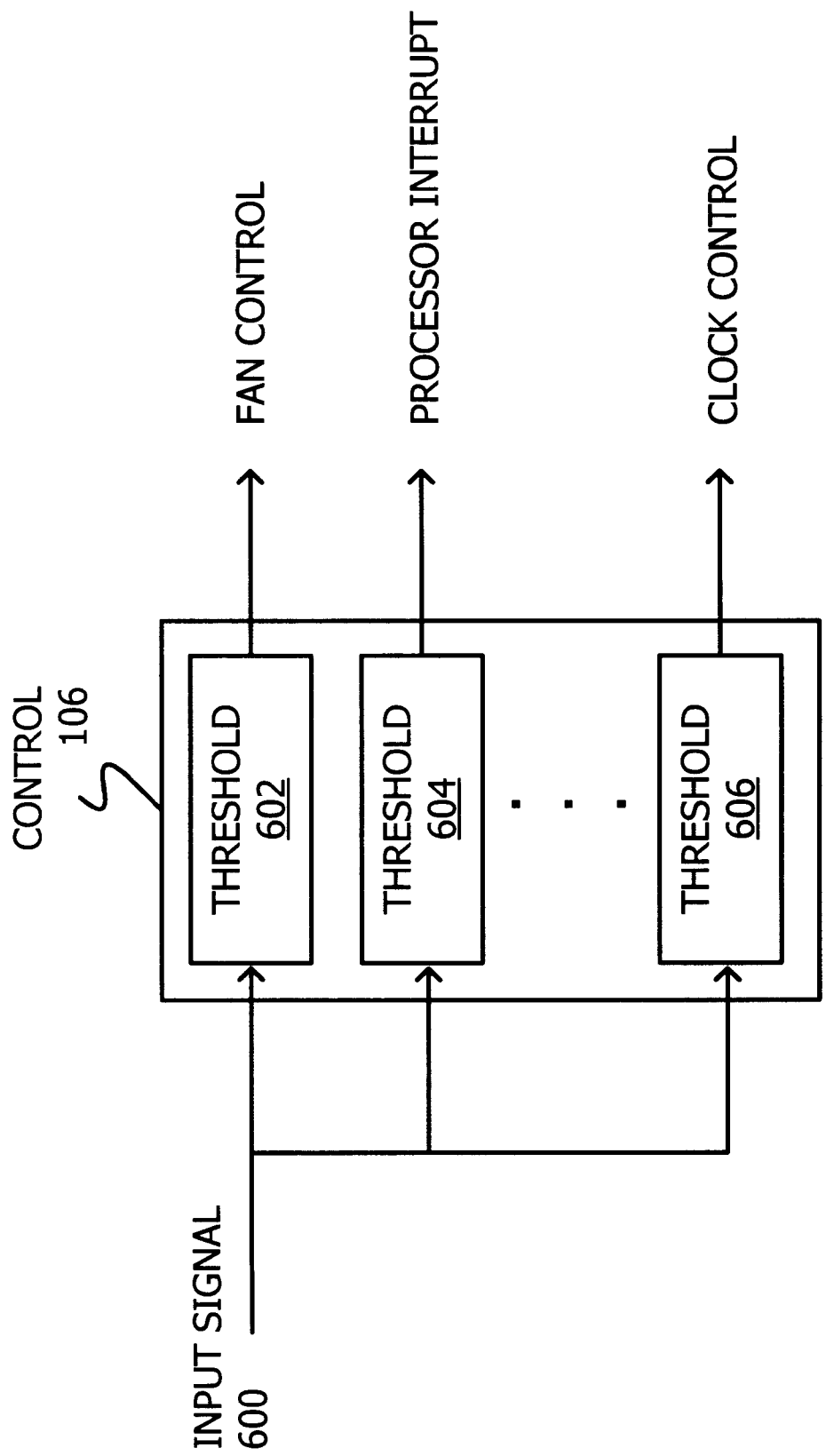
FIG. 6 shows a block diagram of a control circuit in accordance with another embodiment of the invention.

Referring now to FIG. 6, control circuit 106 may also be configured to accept an analog signal indicating the duty cycle of power supply 108's output signal (e.g., analog output signal 312 and 404). In one embodiment, input signal 600 may be supplied to one or more threshold detection circuits 602, 604, and 606. Each threshold detection circuit may have a first threshold that, when exceeded, produces a control signal to perform a specific action. For example, a first threshold may: enable a cooling fan via circuit 602; generate a processor interrupt signal via circuit 604; or cause a reduction in the system clock's operating frequency via circuit 606. Each threshold detection circuit 602, 604, and 606 may also have a second threshold (the same or different from the first threshold) to retract the operation indicated when the first threshold was exceeded.

One benefit of using a direct measure of a circuit's actual power consumption is that power management options (e.g., actions to increase cooling) may be made before circuit components reach a critical temperature. Another benefit in accordance with the invention is that changes in circuit power consumption may be detected and modified far more rapidly than prior techniques relying on thermal measures. Yet another benefit in accordance with the invention is that power consumption may be monitored and managed regardless of the ambient temperature.

Various changes in the materials, components, and circuit elements are possible without departing from the scope of the claims. For instance, a circuit may include multiple power supplies and/or multiple regulators. Power management in accordance with the invention may be applied to any one or combination of such supplies. For example, some computer systems employ a dedicated regulator for the processor—this regulator may be independently monitored and power management options determined in accordance with the invention without the need to incorporate the same capability in all of the system's supplies and/or regulators. In addition, a signal indicative of a circuit's actual power consumption may be provided to a conventional power management device. For example, a conventional power management device may be coupled to computer system 100 by way of an inter-integrated circuit (I²C) control bus sponsored by Phillips Electronic) or a system management bus (SMB) sponsored by Intel Corporation. Such a device may be adapted to accept a measure of a circuit's actual power consumption. Techniques in accordance with the invention may also be used in conjunction with power management techniques employing thermal sensors. For example, a thermal sensor may be used as a fail-safe mechanism to ensure that power management thresholds are not exceeded even when operating in an extreme environment.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A thermal management apparatus, comprising:
   a detection circuit adapted to generate a first signal indicating an amount of power transferred to a device; and
   a control circuit, coupled to the detection circuit, adapted to generate at least one control signal to indicate a thermal condition of the device and to effect a power management action based on the first signal.

2. The thermal management apparatus of claim 1, wherein the device comprises a computer system.

3. The thermal management apparatus of claim 1, wherein the device comprises a central processing unit.

4. The thermal management apparatus of claim 3, wherein the power management action comprises an interrupt signal.

5. The thermal management apparatus of claim 3, wherein the power management action comprises a stop-clock signal.

6. The thermal management apparatus of claim 1, wherein the device comprises a computer peripheral.

7. The thermal management apparatus of claim 1, wherein the power management action comprises a signal to modify an operational characteristic of a fan.

8. The thermal management apparatus of claim 1, further comprising a power source coupled to the detection circuit.

9. The thermal management apparatus of claim 8, wherein the power source comprises a linear power supply.

10. The thermal management apparatus of claim 8, wherein the power source comprises a switching power supply.

11. A thermal management apparatus, comprising:
    a power source furnishing power to a computer system;
    a detection circuit, coupled to the power source, to generate a first signal indicating the power transferred to a portion of the computer system from the power source; and
    a control circuit, coupled to the detection circuit, to generate at least one control signal for activating one or more cooling devices based on the first signal.

12. The thermal management apparatus of claim 11, wherein the portion of the computer system comprises a module comprising a central processing unit.

13. The thermal management apparatus of claim 11, wherein the portion of the computer system comprises a peripheral device.

14. A program storage device, readable by a programmable control device, comprising:
    instructions stored on the program storage device for causing the programmable control device to
       receive a power signal from a power source, the power signal adapted to furnish power to a portion of a circuit,
       generate a first signal to indicate a thermal condition of the portion of the circuit, and
       generate a second signal to effect a power management action based on the first signal.

15. The program storage device of claim 14, wherein the instructions to generate a first signal comprise instructions to generate a signal indicating a duty cycle of the power signal.

16. The program storage device of claim 14, wherein the instructions to generate a second signal comprise instructions to generate a fan control signal.

17. The program storage device of claim 14, wherein the instructions to generate a second signal comprise instructions to generate an interrupt signal.

18. The program storage device of claim 14, wherein the instructions to generate a second signal comprise instructions to generate a processor halt signal.

19. The program storage device of claim 18, wherein the instructions to generate a processor halt signal comprise instructions to generate a stop-clock signal.

20. A thermal management apparatus, comprising:
    a power source to produce a power signal, wherein the power signal is a pulse width modulated signal indicating an amount of power furnished to a portion of a computer system; and a control circuit to effect a power management action, wherein the control circuit receives a representation of a duty cycle of the pulse width modulated signal and generates a second signal based on a state of the representation.

21. The thermal management apparatus of claim 20, wherein the representation includes a digital representation.

22. The thermal management apparatus of claim 20, wherein the representation includes an analog signal.

23. The thermal management apparatus of claim 22, wherein the second signal is generated when the analog signal exceeds a first threshold value.

24. The thermal management apparatus of claim 23, wherein the control circuit further generates a third signal to effect a second power management action based on the analog signal exceeding a second threshold value.

* * * * *